(12) United States Patent
Huang

(10) Patent No.: US 8,132,973 B2
(45) Date of Patent: Mar. 13, 2012

(54) CAMERA SHUTTER

(75) Inventor: Tien-Chung Huang, Chang Hwa (TW)

(73) Assignee: Tricore Corporation, Chang Hwa (TW)

( * ) Notice: Subject to any disclaimer, the term of this patent is extended or adjusted under 35 U.S.C. 154(b) by 0 days.

(21) Appl. No.: 12/801,517

(22) Filed: Jun. 11, 2010

(65) Prior Publication Data

US 2011/0069948 A1    Mar. 24, 2011

(30) Foreign Application Priority Data

Sep. 18, 2009  (JP) ................................. 2009-217515

(51) Int. Cl.
*G03B 9/08* (2006.01)
(52) U.S. Cl. ........................................ 396/463; 396/501
(58) Field of Classification Search .......... 396/449–452, 396/463, 464, 468, 484, 486, 497, 501
See application file for complete search history.

(56) References Cited

U.S. PATENT DOCUMENTS

| 4,334,748 A | * | 6/1982 | Stacklies et al. | 396/463 |
| 4,531,820 A | * | 7/1985 | Petersen | 396/464 |
| 4,558,937 A | * | 12/1985 | Petersen et al. | 396/464 |
| 5,333,025 A | * | 7/1994 | Dowe | 396/469 |
| 2011/0069948 A1 | * | 3/2011 | Huang | 396/463 |
| 2011/0069949 A1 | * | 3/2011 | Huang | 396/468 |

FOREIGN PATENT DOCUMENTS

JP      2001-281724      10/2001

* cited by examiner

*Primary Examiner* — W. B. Perkey
(74) *Attorney, Agent, or Firm* — McGinn IP Law Group, PLLC

(57) ABSTRACT

A camera shutter comprising a shutter driving means which does not immediately start an operation to provide stable movement even though an operation signal is output. A camera shutter comprises a base plate having a shutter opening; a shutter blade for opening and closing the shutter opening; and a driving means for driving the shutter blade, wherein the driving means comprising a swingably journaled swinging lever having an arm portion connected to the shutter blade, a permanent magnet provided on the arm portion, restraining members comprising a magnetic material that face each other at least at one of both end positions of an operating range of the swinging lever and a magnet coil fixed so as to face the permanent magnet; the swinging lever is operated by attractive force toward or repelling force against the permanent magnet that is generated by conduction of electricity to the magnet coil to drive the shutter blade; and an operation of the swinging lever is restricted by the restraining member at an operation stop position and/or a fully open position of the shutter blade under the magnetic force of the permanent magnet.

1 Claim, 4 Drawing Sheets

[FIG. 1]
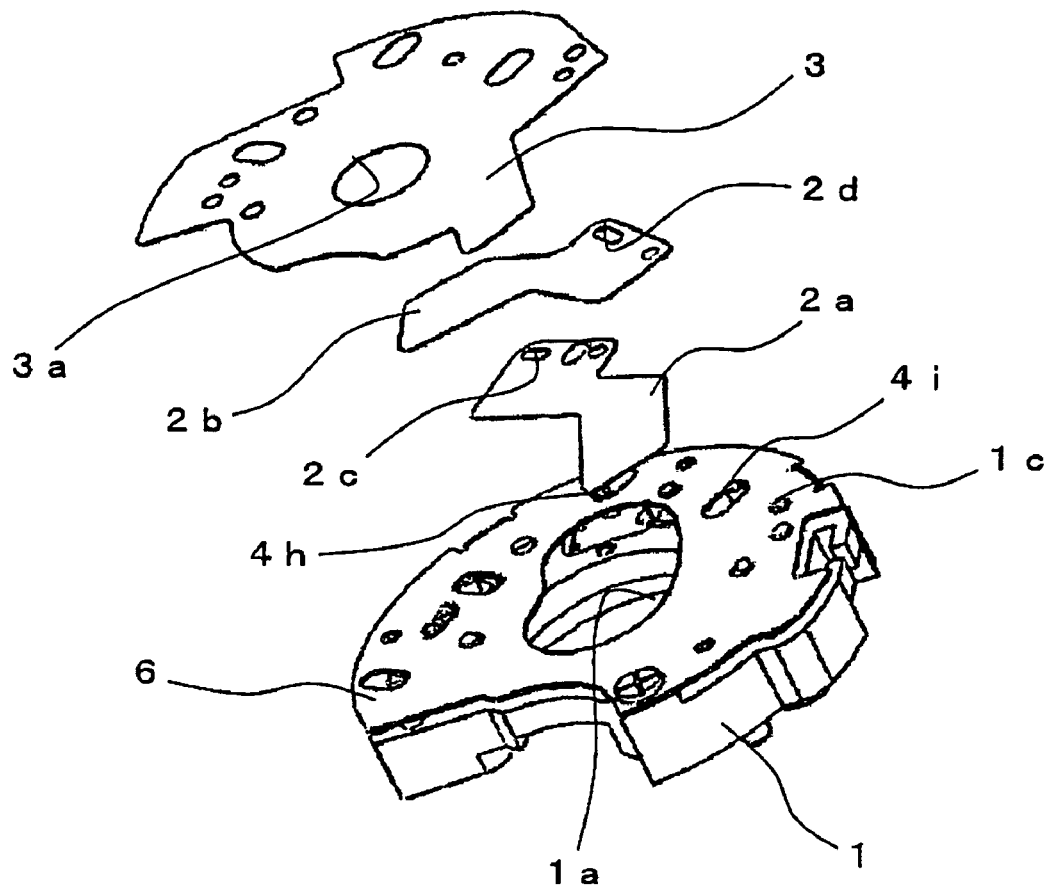

[FIG. 2]
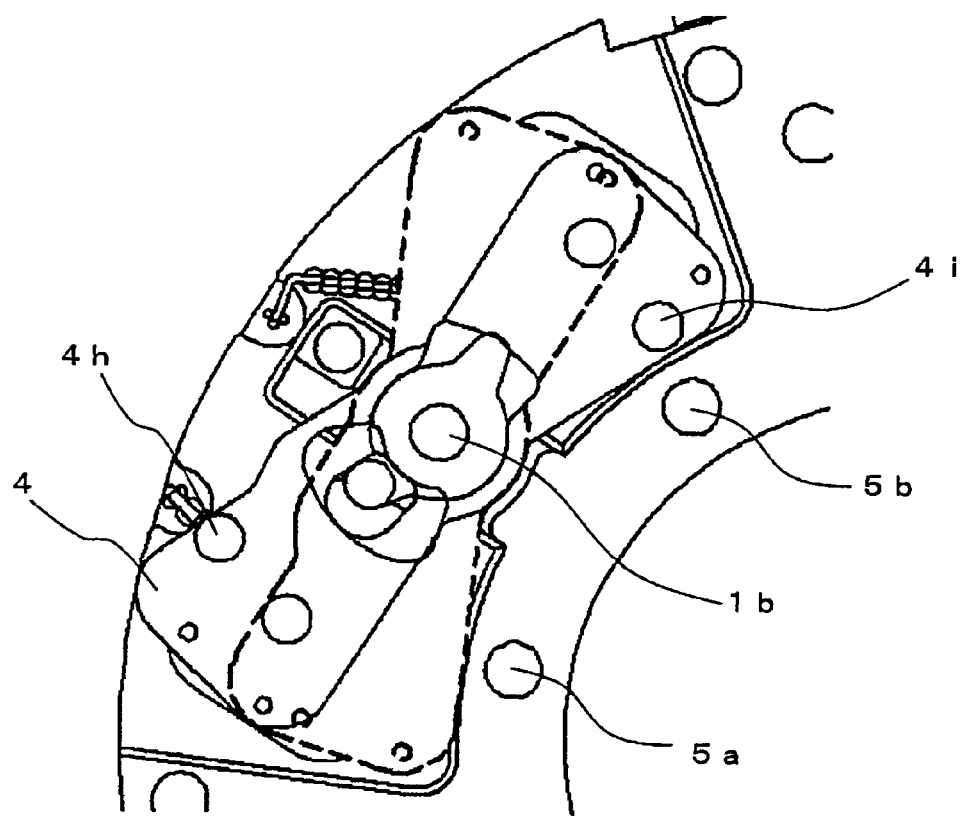
[FIG. 3]
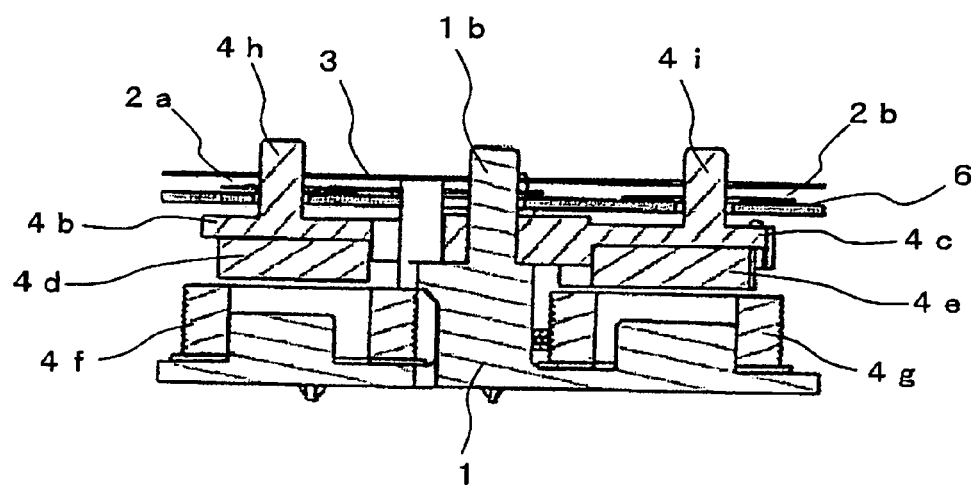

[FIG. 4]
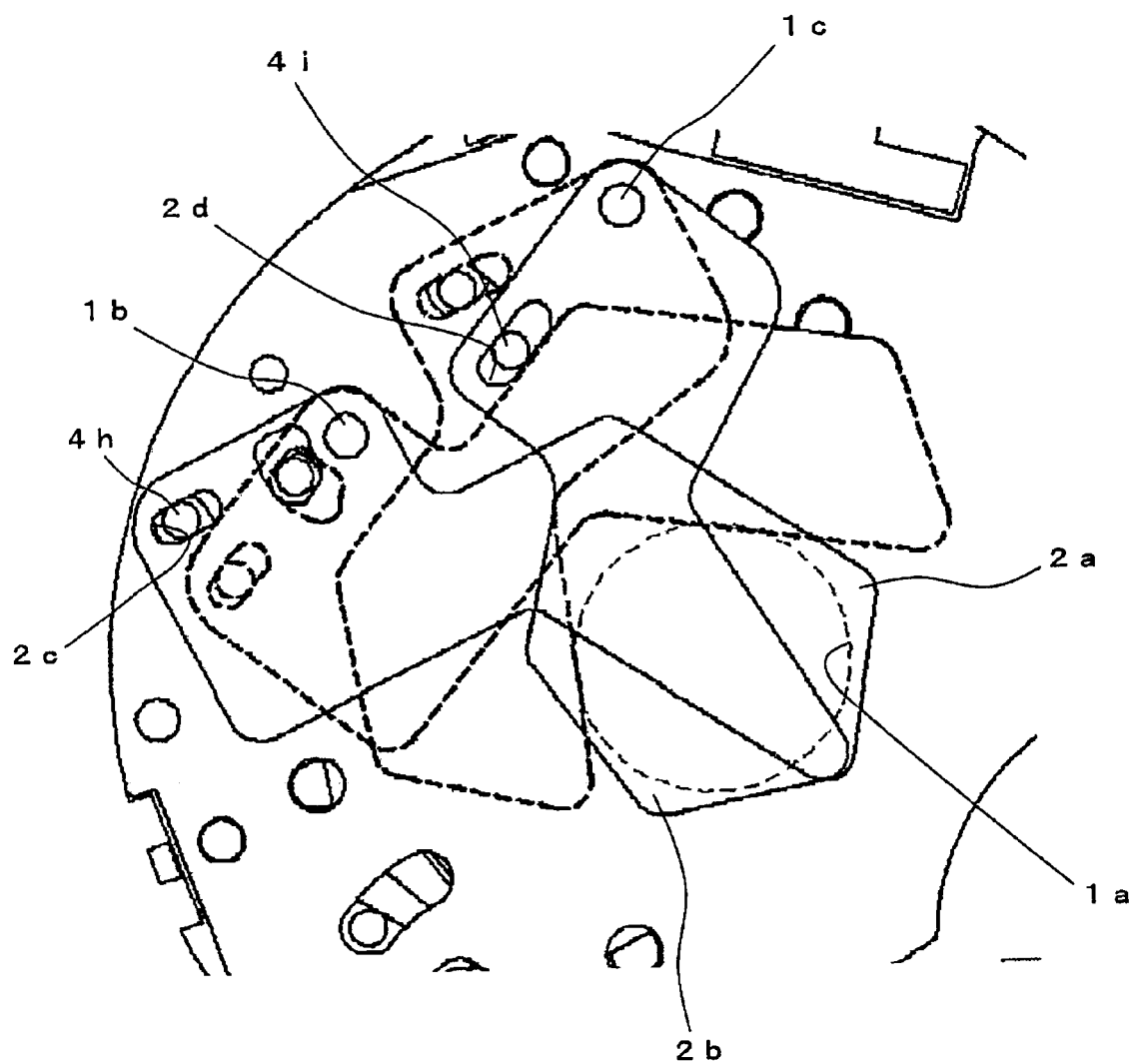

[FIG. 5]
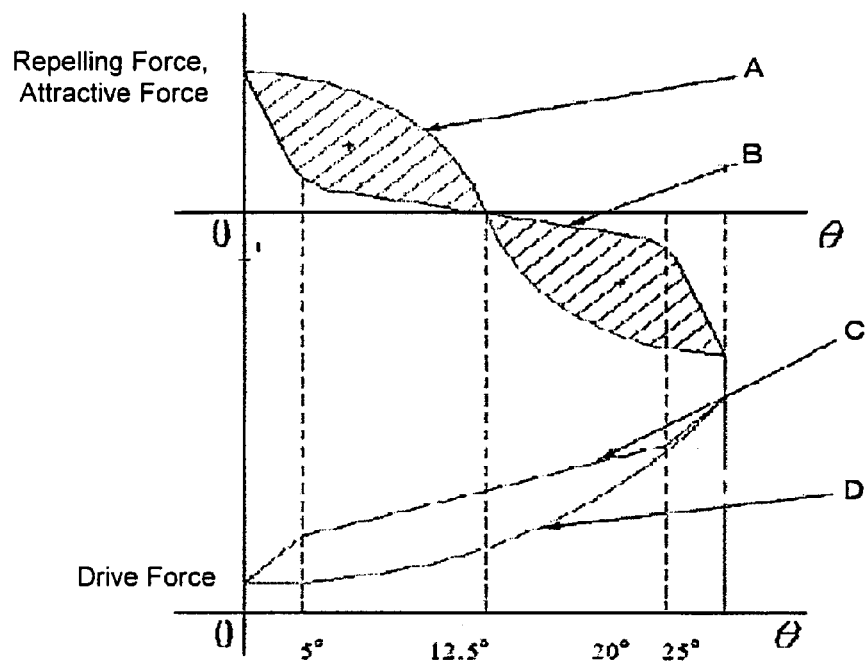
[FIG. 6]
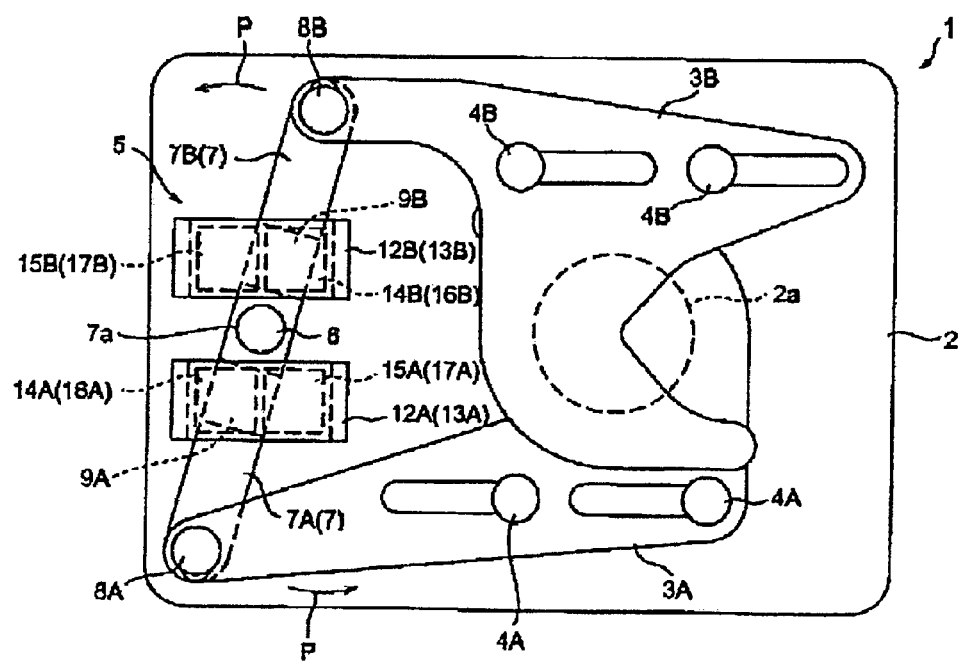

CAMERA SHUTTER

The present application is based on Japanese Patent Application No. 2009-217515 filed on Sep. 18, 2009, the entire contents of which are incorporated herein by reference.

BACKGROUND OF THE INVENTION

1. Field of the Invention

The invention relates to a camera shutter provided with a shutter blade for opening and closing a shutter opening provided on a base plate.

2. Description of the Related Art

A conventional camera shutter such as described in, e.g., JP-A 2001-281724 is known (see FIG. 6). An electromagnetic drive shutter described in JP-A 2001-281724 has a driving means for operating a shutter blade but is not provided with a restraining member at a stop position of a driving lever. In other words, the driving lever immediately starts an operation at a closing position or an opening position of the shutter blade when an operating current is conducted to a magnetic drive coil.

However, in the above-mentioned conventional art, since a restraining member made of a magnetic material for attracting and holding a permanent magnet is not provided at a stop position of the driving lever, a shutter driving means immediately starts an operation when an operation signal is output and the movement is likely to become unstable. In other words, the operation is started in a state that stability of the operation cannot be ensured due to a fitting gap or frictional force between each component, thus, a shutter control tends to be unstable.

Meanwhile, there is a method of attracting and holding by direct contact with the restraining member at the stop position of the driving lever, however, strength of the attractive force is likely to vary due to a roughness condition of both contact surfaces to be attracted and held base on the processing and existence of wave on the whole surface, which causes instability in operating performance. In other words, attracting and holding force is strong when the contact surface is fine and the wave is minimal, on the contrary, the attracting and holding force is weak when the contact surface is rough or the wave is present.

Therefore, it is not possible to separate the both contact surfaces unless magnetic force against the attracting and holding force is generated corresponding to the condition of the both contact surfaces. Furthermore, voltage dependency increases due to such a condition, hence, not preferable. That is, the condition of the contact surface significantly affects function and performance of the operative mechanism.

SUMMARY OF THE INVENTION

It is an object of the invention to provide a camera shutter configured such that a shutter driving means does not immediately start an operation even though an operation signal is output, and further, movement is stable without being affected by a processed state of components.

To achieve the above-mentioned object, a camera shutter according to the present invention comprises a base plate having a shutter opening, a shutter blade for opening and closing the shutter opening and a driving means for driving the shutter blade, wherein the driving means comprising a swingably journaled swinging lever having an arm portion connected to the shutter blade, a permanent magnet provided on the arm portion, restraining members comprising a magnetic material that face each other at least at one of both end positions of an operating range of the swinging lever and a magnet coil fixed so as to face the permanent magnet, the swinging lever is operated by attractive force toward or repelling force against the permanent magnet that is generated by conduction of electricity to the magnet coil to drive the shutter blade, and an operation of the swinging lever is restricted by the restraining member at an operation stop position and/or a fully open position of the shutter blade under the magnetic force of the permanent magnet.

According to the invention described claim 1, since the restraining member is provided at a stop position of the driving lever, the driving means cannot immediately start operating the driving lever even though an operation signal is output. The driving lever then starts the operation when the power of the driving means exceeds the limit of magnetic attractive force to hold the driving lever at the restraining member after the predetermined electricity conduction. Thus, by passing though, in relatively short time, a region where the operation is unstable due to a fitting gap or frictional force between each component, a shutter blade is operated in a state that stability of movement is ensured. Therefore, the operation control of the shutter blade is not destabilized based on each factor, and it is possible to provide a preferable shutter with a stable operation.

BRIEF DESCRIPTION OF THE DRAWINGS

Next, the present invention will be explained in more detail in conjunction with appended drawings, wherein:

FIG. 1 is a bird's-eye view showing a configuration of a shutter blade in an embodiment of the present invention;

FIG. 2 is a plan view showing an enlarged main portion in the embodiment of the invention;

FIG. 3 is a cross sectional view showing an enlarged main portion in the embodiment of the invention;

FIG. 4 is an operation explanatory view showing the shutter blade in the embodiment of the invention;

FIG. 5 is an operation explanatory view showing drive force with respect to an operational rotation angle of a swinging lever and repelling force as well as attractive force of a permanent magnet in the embodiment of the invention; and FIG. 6 is an explanatory view showing a configuration of a conventional shutter.

DETAILED DESCRIPTION OF THE PREFERRED EMBODIMENTS

A preferred embodiment of a camera shutter according to the present invention will be described below in conjunction with the drawings.

At first, the embodiment of the camera shutter according to the invention will be described referring to FIGS. 1 to 4. A camera shutter shown in FIG. 1 shows an embodiment of a lens shutter. The lens shutter has a base plate 1 provided with a circular shutter opening 1a. On the base plate 1, a pair of shutter blades 2a and 2b for opening and closing the shutter opening 1a is pivotally mounted around supporting shafts 1b and 1c. An oval operating groove 2c is formed on the shutter blade 2a and an oval operating groove 2d is formed on the shutter blade 2b.

In addition, a cover plate 3 is mounted above the base plate 1 while securing an operating space for the shutter blades 2a and 2b. An opening 3a of which center coincides with that of the shutter opening 1a of the base plate 1 is formed on the cover plate 3. Moreover, a driving means 4 for operating opening and closing of the shutter blades 2a and 2b is arranged on a left side of the shutter opening 1a of the base plate 1 in a state shown in FIG. 2.

As shown in FIGS. 1 and 2, the driving means 4 has a swinging lever 4a formed of synthetic resin and is pivotally mounted to the supporting shaft 1b which is provided on the base plate 1. The swinging lever 4a has arms 4b and 4c extending toward both sides of the supporting shaft 1b, and permanent magnets 4d and 4e are respectively fixed and attached to the arms 4b and 4c.

In addition, drive coils 4f and 4g are fixed on the base plate 1 so as to face the permanent magnets 4d and 4e which are fixed to the arms 4b and 4c of the swinging lever 4a. It is configured that control current is conducted to the drive coils 4f and 4g from a non-illustrated electronic control circuit for a predetermined time period.

Meanwhile, projections 4h and 4i are formed on the arms 4b and 4c of the swinging lever 4a, and the projections 4h and 4i are respectively engaged with the oval operating grooves 2c and 2d formed on the shutter blades 2a and 2b in order to operate the shutter blades 2a and 2b, thereby opening and closing the shutter opening 1a.

Furthermore, restraining members 5a and 5b for drawing the permanent magnets 4d and 4e are fixed on the base plate 1 at both ends of the operating range of the swinging lever 4a, i.e., at the positions where the shutter blades 2a and 2b are closed and opened by the projections 4h and 4i of the arms 4b and 4c. In other words, the restraining members 5a and 5b are made of a magnetic material, and attract and hold the permanent magnets 4d and 4e by predetermined magnetic force at the both end positions of the operating range of the swinging lever 4a. A distance therebetween and volume as well as magnetic material of the restraining members 5a and 5b are determined so as to obtain the predetermined magnetic force.

In other words, the stability of the operation at the time of staring the operation of the driving means 4 is not ensured and thus varies due to inertia of the shutter blades 2a and 2b and the fitting gap between the operating grooves 2c, 2d and the projections 4h, 4i provided on the permanent magnets 4d and 4e. Therefore, from the viewpoint of these characteristics, the volume and the magnetic material, etc. of the restraining members 5a and 5b are determined so that the attracting and holding force by the permanent magnets 4d and 4e is set to the predetermined magnetic force.

In this case, the permanent magnets 4d and 4e could be brought in tight contact with the restraining members 5a and 5b as mentioned above. However, when the permanent magnets 4d and 4e are in tight contact with the restraining members 5a and 5b, the driving means 4 is operated and it is necessary to increase the power to separate the both by conduction of electricity to the magnet coil and large energizing power is required, hence, not preferable. Therefore, the present embodiment is configured such that the both are arranged at a predetermined distance. In detail, a gap between the permanent magnets 4d and 4e and the restraining members 5a and 5b in FIG. 2 is 0.2-0.3 mm in the configuration of the present embodiment.

Due to such a configuration, only the swinging lever 4a is displaced and gaps between each component are respectively displaced on one side of an operating direction at an initial stage of the conduction of electricity to the drive coils 4f and 4g. In addition, since the swinging lever 4a operates the shutter blades 2a and 2b in a state that the variation factor due to the gaps is removed in one direction, it is possible to ensure the stable operating performance.

Although other components for shutter control are arranged on the base plate 1, there is no direct relation with the operation of the camera shutter, and thus, only a partial illustration is shown and the entire illustration and explanation are omitted so that the main portion of the camera shutter is easily understood.

A thin partition plate 6 is arranged so as to cover the operation region so that the components for the shutter control, including the driving means 4, arranged on the base plate 1 do not disturb the operation of the shutter blades 2a and 2b.

A method of operating the camera shutter configured as described above will be described in detail below. When the control current is conducted to the drive coils 4f and 4g from the non-illustrated electronic control circuit for a predetermined time period in accordance with a release operation for taking a photograph, the drive force in a direction against the magnetic force of the permanent magnets 4d and 4e is generated in the drive coils 4f and 4g. Depending on the drive force, the swinging lever 4a swings counterclockwise around the supporting shaft 1b by reaction force of the permanent magnets 4d and 4e from the state indicated by a solid line to the state indicated by a dashed line in FIG. 2. In this case, although the control current is conducted from an electronic control circuit to the drive coils 4f and 4g, the permanent magnet 4e is still held at the restraining member 5b and the swinging lever 4a is displaced only in the fitting gap between each component but does not swing since the magnetic force generated in the drive coils 4f and 4g is small at the initial stage of the conduction of electricity.

However, when the conduction of electricity continues after elapse of the predetermined period of time, large drive force is gradually generated in the drive coils 4f and 4g in a direction against the magnetic force of the permanent magnets 4d and 4e, and the swinging lever 4a rapidly swings when the drive force exceeds the limit to hold. In accordance with the operation of the swinging lever 4a, the projections 4h and 4i move in the oval operating grooves 2c and 2d to swing the shutter blades 2a and 2b from the state indicated by a solid line to the state indicated by a dashed line in FIG. 4, and the shutter opening 1a is thereby moved in an opening direction.

In other words, by the rapid swinging of the swinging lever 4a, unstable factors caused by the inertia of the shutter blades 2a and 2b or the fitting gap between the operating grooves 2c, 2d and the projections 4h, 4i provided on the arms 4b and 4c of the swinging lever 4a or the like, i.e., the unstable factors of the operation at the time of staring the operation of the driving means 4, are removed and it is thus possible to ensure the relatively stable operation of the shutter blades 2a and 2b.

Sequentially, the swinging lever 4a swings and the shutter blades 2a and 2b thus swing to a position indicated by a dashed line in FIG. 4, thereby completely opening the shutter opening 1a. When the swinging lever 4a swings to this position, the permanent magnet 4d is attracted and held by the restraining member 5a and the shutter blades 2a and 2b thereby keep the completely opened state.

Once the desired exposure time of the shutter has elapsed, the control current for closing the shutter blades 2a and 2b is conducted from the non-illustrate electronic control circuit to the drive coils 4f and 4g for the predetermined time period, and the drive force in a direction against the magnetic force of the permanent magnets 4d and 4e is generated in the drive coils 4f and 4g in a direction to close the shutter blades 2a and 2b. Depending on the drive force, the swinging lever 4a swings clockwise around the supporting shaft 1b by reaction force of the permanent magnets 4d and 4e from the state indicated by a dashed line to the state indicated by a solid line in FIG. 2. In this case, although the control current is conducted from the electronic control circuit to the drive coils 4f and 4g, the permanent magnet 4d is held at the restraining member 5a and the swinging lever 4a does not swing in the same manner as the aforementioned opening operation since the magnetic force generated in the drive coils 4f and 4g is small at the initial stage of the conduction of electricity.

When the conduction of electricity further continues, large drive force is gradually generated in the drive coils 4f and 4g in a direction against the magnetic force of the permanent magnets 4d and 4e, and the swinging lever 4a rapidly swings when the drive force exceeds the limit to hold, in the same manner as the aforementioned opening operation. In accordance with the operation of the swinging lever 4a, the projections 4h and 4i move in the oval operating grooves 2c and 2d to swing the shutter blades 2a and 2b from the state indicated by a dashed line to the state indicated by a solid line in FIG. 4, and the shutter opening 1a is thereby operated in a closing direction.

The conduction of electricity still continues, the swinging lever 4a swings and the shutter blades 2a and 2b thus swing to a position indicated by a solid line in FIG. 4, thereby completely closing the shutter opening 1a. When the swinging lever 4a swings to this position, the permanent magnet 4e is attracted and held by the restraining member 5b and the shutter blades 2a and 2b thereby keep the completely closed state.

The operation of the drive force with respect to an operational rotation angle of the swinging lever 4a and repelling force as well as attractive force of the permanent magnets 4d and 4e will be described below referring to FIG. 5. All lines show a relation between drive force F with respect to an operational angle (vertical axis) of the swinging lever 4a and the repelling force as well as the attractive force of the permanent magnets 4d and 4e against and toward the restraining members 5a and 5b. Each of the lines will be explained below.

In FIG. 5, the line A shows a repelling/attractive force curve without presence of the restraining members 5a and 5b, in which the positive side with respect to the zero level indicates the repelling force and the negative side indicates the attractive force. In other words, when the swinging lever 4a is rotated by the conduction of electricity to the coil, the repelling force gradually decreases since the restraining members 5a and 5b do not exist, and after reaching the zero level, the swinging lever 4a is operated to the stop position depending on the attractive force toward the opposite magnetic pole.

The line B shows a repelling/attractive force curve with presence of the restraining members 5a and 5b. When the swinging lever 4a is rotated by the conduction of electricity to the coil, the repelling force steeply decreases since the restraining members 5a and 5b exist, and when the swinging lever 4a is gradually rotated and approaches to the end position of the operation, the swinging lever 4a is rapidly attracted toward the stop position depending on the attractive force toward the opposite magnetic pole.

The line C shows a driving force curve with presence of the restraining members 5a and 5b and it is shown that, since the restraining members 5a and 5b exist, the drive force must be rapidly increased by the conduction of electricity to the coil in order to escape from the attractive force of the restraining members 5a and 5b until immediately after starting the rotation of the swinging lever 4a. After that, the drive force gradually increases, and when the swinging lever 4a is rotated and gradually approaches to the end position of the operation, the attractive force toward the opposite magnetic pole is added and the swinging lever 4a is rapidly attracted toward the stop position.

The line D shows a driving force curve without presence of the restraining members 5a and 5b. When the swinging lever 4a is rotated by the conduction of electricity to the coil, the drive force gradually increases since the restraining members 5a and 5b do not exist, and the swinging lever 4a is operated to the stop position depending on the attractive force toward the opposite magnetic pole with continuous gradual acceleration.

In the present embodiment, although the swinging lever 4a is configured so that the shutter blades 2a and 2b are attracted and held at the both ends of the operating range between the closing position and the opening position by the restraining members 5a and 5b which attract the permanent magnets 4d and 4e, it is possible to implement by attracting and holding at only one of the both end portions of the operating range. In other words, it may be configured so as to implement only at a position where the effect of the invention is required.

Although the embodiment of the camera shutter according to the invention has been described above, the invention is, needless to say, not limited to the above-mentioned embodiment. For example, although the camera shutter in the above embodiment is a two-bladed rotary lens shutter, it is applicable to the camera shutter using a sliding blade or other forms of blade. In addition, if the magnetic pole of the permanent magnet in the above description is configured as a reverse magnetic pole, the current conducted to the coil is reversed or the repelling force in the description acts as the attractive force. Therefore, it is a configuration in which the swinging lever is operated by the attractive force or the repelling force of the permanent magnet generated by the conduction of electricity to the coil to drive the shutter blade.

It is to be understood that the invention is not limited to the above-mentioned embodiment, and appropriate changes can be made to the embodiment without departing from the scope of the present invention.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A camera shutter, comprising:
   a base plate having a shutter opening;
   a shutter blade for opening and closing the shutter opening; and
   a driving means for driving the shutter blade,
   wherein the driving means comprises a swinging lever that has an arm portion connected to the shutter blade and is swingably journaled on the base plate, a permanent magnet provided on the arm portion, restraining members comprising a magnetic material that face each other at least at one of both end positions of an operating range of the swinging lever and are fixed on the base plate, and a magnet coil fixed on the base plate so as to face the permanent magnet;
   the swinging lever is operated by attractive force toward or repelling force against the permanent magnet that is generated by conduction of electricity to the magnet coil to drive the shutter blade; and
   an operation of the swinging lever is restricted by the restraining member at an operation stop position and/or a fully open position of the shutter blade under the magnetic force of the permanent magnet.

* * * * *